(12) United States Patent
Manzoor et al.

(10) Patent No.: US 10,851,870 B2
(45) Date of Patent: Dec. 1, 2020

(54) LOW FREQUENCY TORSIONAL VIBRATION DAMPER HAVING A FORMED HUB

(71) Applicant: DAYCO IP HOLDINGS, LLC, Troy, MI (US)

(72) Inventors: Suhale Manzoor, Plymouth, MI (US); Thomas D. Hughes, Dearborn Heights, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 150 days.

(21) Appl. No.: 15/952,294

(22) Filed: Apr. 13, 2018

(65) Prior Publication Data

US 2018/0298980 A1 Oct. 18, 2018

Related U.S. Application Data (60) Provisional application No. 62/485,652, filed on Apr. 14, 2017.

(51) Int. Cl.
*F16F 15/14* (2006.01)
*F16F 15/136* (2006.01)
(Continued)

(52) U.S. Cl.
CPC .......... *F16F 15/1442* (2013.01); *B21D 39/02* (2013.01); *F16F 15/136* (2013.01);
(Continued)

(58) Field of Classification Search
CPC ............... F16F 15/1442; F16F 15/1435; F16F 15/1492; F16F 15/136; F16F 15/167;
(Continued)

(56) References Cited

U.S. PATENT DOCUMENTS 3,088,332 A * 5/1963 Arnt, Jr. ................. F16F 15/126
74/574.4
3,334,886 A 8/1967 Caunt
(Continued)

FOREIGN PATENT DOCUMENTS

DE 3340259 A1 5/1985
DE 4344426 A1 * 6/1995 ............ F16F 15/136
(Continued)

OTHER PUBLICATIONS

EP, European Supplemental Search Report; European Application No. 18167303.9 (dated Jul. 27, 2018).

*Primary Examiner* — Daniel D Yabut
(74) *Attorney, Agent, or Firm* — FisherBroyles, LLP; Susan M. Oiler (57) ABSTRACT

A low frequency torsional vibration damper has an annular inertia member defining an annular recess for receiving an elastomeric O-ring in a radial outer surface or a radial inner surface thereof and defining opposing annular recesses for receiving elastomeric O-rings, one each, in the top and bottom surfaces thereof, an elastomeric O-ring seated in each annular recess, and a hub defining an annular receptacle with opposing sidewalls that each comprise a plurality of spaced apart tabs permanently deformed against the plurality of elastomeric O-rings, thereby operatively coupling the hub to the inertia member for rotation together. When the inertia member defines the outer diameter of the torsional vibration damper, the hub is mountable on a shaft, and when the inertia member defines the inner diameter of the torsional vibration damper, the hub is mountable inside a shaft.

19 Claims, 4 Drawing Sheets

(51) Int. Cl.
  *B21D 39/02* (2006.01)
  *F16F 15/12* (2006.01)
  *B21D 26/021* (2011.01)

(52) U.S. Cl.
  CPC ........ *B21D 26/021* (2013.01); *F16F 15/1203* (2013.01); *F16F 2222/08* (2013.01); *F16F 2224/025* (2013.01); *F16F 2224/0208* (2013.01); *F16F 2226/04* (2013.01); *F16F 2230/0005* (2013.01); *F16F 2232/02* (2013.01); *F16F 2234/02* (2013.01)

(58) Field of Classification Search
  CPC ... F16F 15/08; F16F 15/1203; Y10T 74/2131; Y10T 74/2125; Y10T 74/2132; Y10T 74/2119; Y10T 74/2121
  See application file for complete search history.

(56) References Cited

U.S. PATENT DOCUMENTS

| | | | |
|---|---|---|---|
| 3,678,782 A | | 7/1972 | Aoki |
| 5,591,093 A | | 1/1997 | Asai et al. |
| 5,749,269 A | * | 5/1998 | Szymanski ............ F16F 15/14 |
| | | | 74/573.12 |
| 8,074,336 B2 | | 12/2011 | Simon |
| 8,342,058 B2 | | 1/2013 | Christenson et al. |
| 2016/0102730 A1 | | 4/2016 | Manzoor et al. |

FOREIGN PATENT DOCUMENTS

| | | |
|---|---|---|
| DE | 10241316 | 3/2004 |
| JP | H03-103638 A2 | 4/1991 |
| WO | 9335454 A1 | 12/1995 |

\* cited by examiner

FIG. 4A (Prior Art)
Mode 1: Conical
at 79 Hz

FIG. 4B (Prior art)
Mode 2: Torsional
at 80 Hz

FIG. 4C (Prior art)
Mode 3: Axial
at 94 Hz

FIG. 5A
Mode 1: Torsional
at 80 Hz

FIG. 5B
Mode 2: Radial
at 116 Hz

FIG. 5C
Mode 3: Conical
at 362 Hz

FIG. 6

LOW FREQUENCY TORSIONAL VIBRATION DAMPER HAVING A FORMED HUB

RELATED APPLICATIONS

This application claims the benefit of U.S. Provisional Application No. 62/485,652, filed Apr. 14, 2017, the entirety of which is incorporated herein by reference.

TECHNICAL FIELD

The present invention relates to torsional vibration dampers for vehicle engines and, more particularly, to torsional vibration dampers having a formed hub, which eliminates molding, bonding, or adhering the components together and eliminates fluid, such as oil or grease, from the assembly process.

BACKGROUND

Low frequency torsional vibration dampers are usually of the mold bonded variety. Mold bonding is the process by which the elastomeric material is bonded to the metals in a molding process, such as an injection molding process (see FIG. 1). Mold bonding includes cleaning the metallic surfaces through shot or sand blasting, applying a primer to the cleaned metallic surfaces, applying an adhesive to the primed surfaces, placing the metals in an injection mold, and injecting the elastomeric material. This process causes a significant increase in the cost of the damper. Thus, dampers that do not require such a process and have better performance are needed.

SUMMARY

In all aspects, low frequency torsional vibration dampers are disclosed that have an annular inertia member defining an annular recess for receiving an elastomeric O-ring in a radial outer surface or a radial inner surface thereof and defining opposing annular recesses for receiving elastomeric O-rings, one each, in the top and bottom surfaces thereof, an elastomeric O-ring seated in each annular recess, and a hub defining an annular receptacle with opposing sidewalls that each comprise a plurality of spaced apart tabs permanently deformed against the plurality of elastomeric O-rings, thereby operatively coupling the hub to the inertia member for rotation together. When the inertia member defines the outer diameter of the torsional vibration damper, the hub is mountable on a shaft, and when the inertia member defines the inner diameter of the torsional vibration damper, the hub is mountable inside a shaft. The opposing annular recesses are positioned proximate whichever of the radial outer surface or the radial inner surface has the annular recess.

In all embodiments, the inertia member has a first portion with a primary axial width and a second portion with a secondary axial width. The second portion is seated in the annular receptacle defined by the hub and the secondary axial width is smaller than the primary axial width. Each elastomeric O-rings is seated in its respective annular recess without an adhesive, and there is no adhesive or fastener attaching the hub to the inertia member.

In all embodiments, finite element modeling demonstrates that the torsional vibration damper has a first mode of vibration that is torsional and a second mode of vibration that is radial. Further, the finite element modeling demonstrates that the second mode of vibration is decoupled from the first mode of vibration by at least 20 Hz.

In all embodiments, the annular receptacle of the hub, optionally, defines annular recesses that align one each with the annular recess and the opposing annular recesses of the inertia member.

In one embodiment, the torsional vibration damper has an additional annular recess (a fourth annular recess) in the annular inertia member and an O-ring seated therein at a position that places the O-ring operatively between the inertia member and the hub.

In another aspect, methods of making torsional vibration dampers, in particular low frequency torsional vibration dampers, are described. The methods include providing an inertia member defining an annular recess for receiving an elastomeric O-ring in a radial outer surface or a radial inner surface thereof and defining generally opposing annular recesses for receiving elastomeric O-rings, one each, in opposing top and bottom surfaces thereof. The opposing annular recesses are positioned proximate whichever of the radial outer surface or the radial inner surface has the annular recess and positioning an elastomeric O-ring, one each, in the annular recess and the opposing annular recesses. The method also includes providing an annular hub precursor shaped as an annular band having a first plurality of spaced apart tabs and a second plurality of spaced apart tabs both extending outward therefrom in opposing directions from two parallel circular bases of the annular band or from two parallel cylindrical surfaces of the annular band. Each tab of the first and second plurality of spaced apart tabs has a first thickness substantially the same as a second thickness of the annular band as measured from a longitudinal cross-section of the hub precursor. The method then requires permanently bending the first plurality of spaced apart tabs and the second plurality of spaced apart tabs around the inertia member in contact with each of the elastomeric O-rings, which operatively couple the hub to the inertia member for rotation together. The inertia member and the elastomeric O-rings may be provided in an unassembled state or and assembled state.

In one aspect, permanently bending the plurality of spaced apart tabs is done sequentially by first permanently bending the first plurality of spaced apart tabs to define a first flange and form a hub precursor intermediate having a first angle matable to a bottom surface of the inertia member. Next, the method includes seating the inertia member intermediate against the hub precursor intermediate with the first angle of the first flange mated against the bottom surface of the inertia member with at least a first and a second O-ring positioned between the hub precursor intermediate and the inertia member intermediate, and then permanently bending the second plurality of spaced apart tabs against the inertia member intermediate with a third O-ring therebetween to operatively couple the hub to the inertia member for rotation therewith.

In one aspect, the hub precursor is a generally flat annular disc where the second plurality of spaced apart tabs define the inner diameter of the disc and are each generally wedge-shaped and the first plurality of spaced apart tabs define the outer diameter of the disc and are each generally wedge-shaped. Each generally wedge-shaped tab of the first plurality of spaced apart tabs is narrowest at its junction to the annular band portion of the hub precursor, and each generally wedge-shaped tab of the second plurality of spaced apart tabs is widest at its junction to the annular band portion of the hub precursor. This method may include hydroforming the flat annular disc as the hub precursor.

In one embodiment, the first plurality of spaced apart tabs and the second plurality of spaced apart tabs are mirror images of one another. In another embodiment, the first plurality of spaced apart tabs and the second plurality of spaced apart tabs are aligned with one another but are not mirror images of one another. In yet another embodiment, the first plurality of spaced apart tabs are staggered offset from the second plurality of spaced apart tabs.

In another embodiment, the hub precursor is a cylindrical tube having a height greater than the second thickness and the first plurality of spaced apart tabs and the second plurality of spaced apart tabs are mirror images of one another. This method may include forming the hub precursor by cutting slits into two parallel circular bases of a metal cylindrical tube.

BRIEF DESCRIPTION OF DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
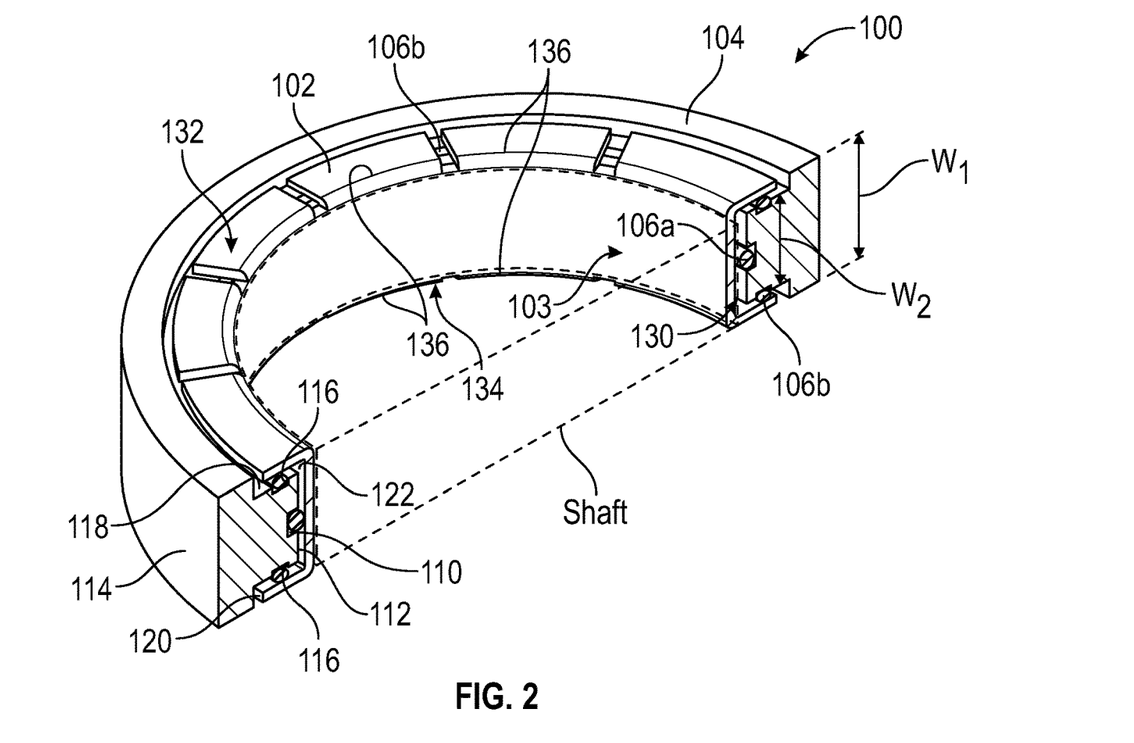
FIG. 2 is a longitudinal cross-section, perspective view of a torsional vibration damper having a formed hub disclosed herein.

A torsional vibration damper, generally designated by reference 100 in FIG. 2, is described that includes a hub 102 mountable on a shaft to attenuate torsional vibrations by receiving a shaft through its central bore 103 and an inertia member 104 disposed concentric with and generally spaced radially outward from the hub 102 by at least one elastomeric O-ring 106a. Here, the annular inertia member 104 defines an annular recess 110 for receiving the elastomeric O-ring 106a in a radial inner surface 112 thereof and defines generally opposing annular recesses 116 for receiving additional elastomeric O-rings 106b, one each, in opposing top and bottom surfaces 118, 120 thereof. The opposing annular recesses 116 are positioned proximate the radial inner surface 112, which includes the annular recess 110. One advantage of this construction is that no adhesive or other bonding agent is necessary to retain the elastomeric O-rings in any of the annular recesses during any phase of the manufacturing process.

O-rings typically are circular when viewed in a longitudinal cross-section but are not limited thereto. For example, the O-rings may have a square, X-shape, or V-shape profile when viewed in a longitudinal cross-section. The O-rings 106a, 106b are each dimensionally larger than the depth of the annular recess 110, 116 in which it is received and a portion of each O-ring 106a, 106b remains protruding from the annular recess. As such, the O-rings 106a, 106b have a diameter (or other similar dimension) sufficient to define a clearance gap 130 between the inertia member 104 and the hub 102, which contributes to the torsional vibration damper being a low frequency torsional vibration damper. "Low frequency" as used herein is a frequency range of 50 Hz to 150 Hz.

The hub 102 has a generally U-shaped, longitudinal cross-section defining an annular receptacle 122. The top sidewall 132 and the bottom sidewall 134 of the hub 102 are defined, individually, by a plurality of spaced apart tabs 136 that are permanently deformed against the elastomeric O-rings 106b seated in the opposing annular recesses 116. The first plurality of spaced apart tabs 136 that define the top sidewall 132 and the second plurality of spaced apart tabs 136 that define the bottom sidewall 134 are aligned with one another and may begin as mirror images of one another in a hub precursor (see FIG. 3). However, it is equally possible that the first plurality of spaced apart tabs and the second plurality of spaced apart tabs may be positioned offset relative to one another. The top sidewall and the bottom sidewall 132, 134 may comprise the same number of tabs or may have a different number of tabs. The tabs may be generally square, rectangular, wedge-shaped, or other polygonal-shape. The tabs may all have generally identical shape/size, may differ in size, or may have alternating shapes and sizes.

Figure 3:
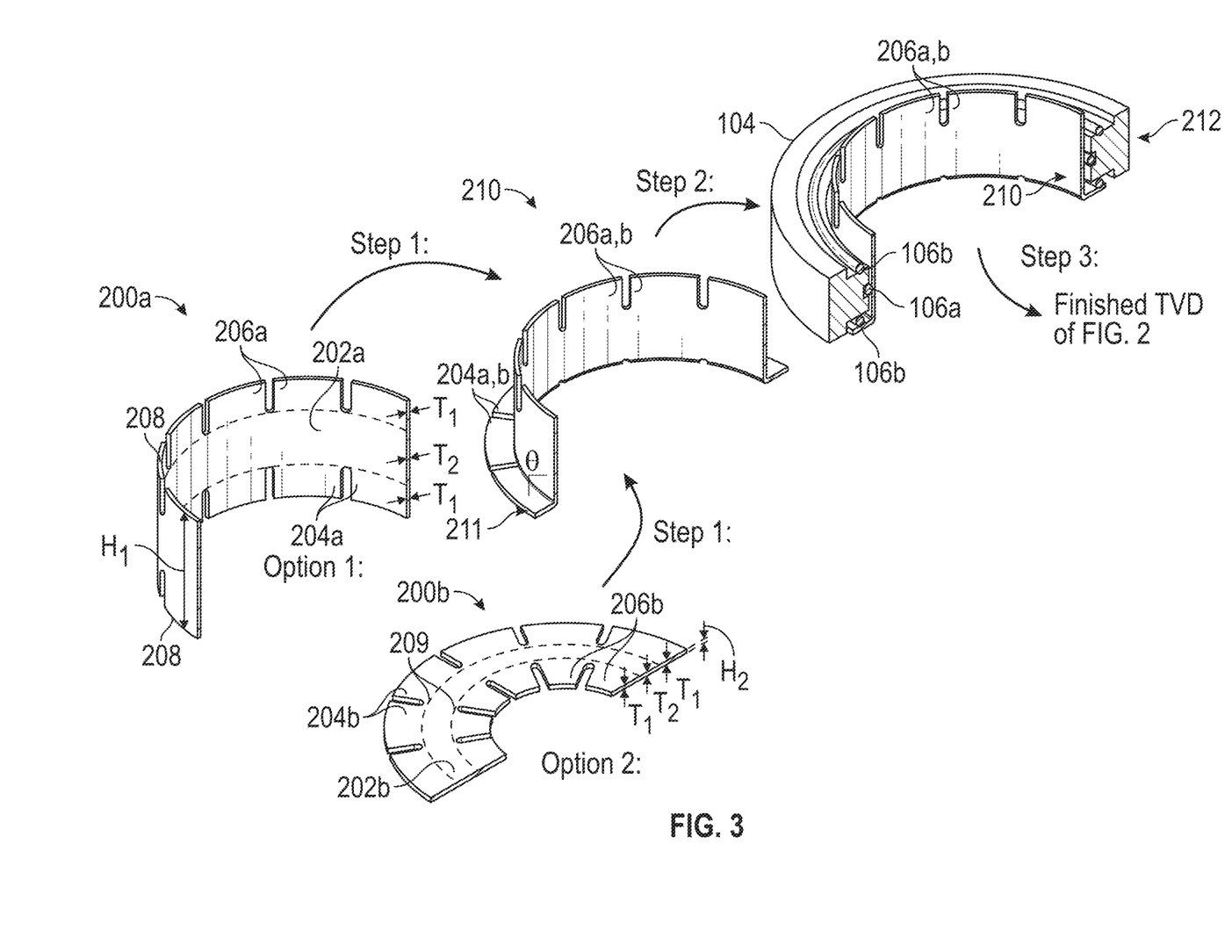
FIG. 3 is flow diagram of the steps of forming the hub about the inner diameter of the inertia member.

As seen from the cylindrical tube precursor 200a in FIG. 3, in one embodiment, the first plurality of spaced apart tabs 204a and the second plurality of spaced apart tabs 206a are generally rectangular in shape and are mirror images of one another.

As seen from the generally flat annular disc precursor 200b in FIG. 3, in another embodiment, the first plurality of spaced apart tabs 204b define the outer diameter of the disc precursor 200b and each are generally wedge-shaped. Each generally wedge-shaped tab is narrowest at its junction to the annular band portion 202b of the hub precursor. The second plurality of spaced apart tabs 206b define the inner diameter of the disc precursor 200b and are each generally wedge-shaped as well. Each generally wedge-shaped tab of the second plurality of spaced apart tabs 206b is widest at its junction to the annular band portion 202b. Here, each of the first plurality of spaced apart tabs 204b is generally aligned with one of tabs of the second plurality of spaced apart tabs 206b.

The annular inertia member 104, in particular, a second portion thereof of a secondary axial width $W_2$ (as labeled in FIG. 2), is seated within the annular receptacle 122 of the hub 102 with the plurality of elastomeric O-rings operatively coupling the hub 102 and inertia member 104 for rotation together. A first portion of the annular inertia member 104 has a primary axial width $W_1$. As illustrated in FIG. 2, the secondary axial width $W_2$ is smaller than the primary axial width $W_1$. With the plurality of elastomeric O-rings 106a, 106b seated in the annular recess 110 and opposing annular recesses 116, the hub 102 and inertia member 104 are spaced apart from one another radially and axially, thereby defining a clearance gap 130 therebetween, as discussed above.

Figure 6:
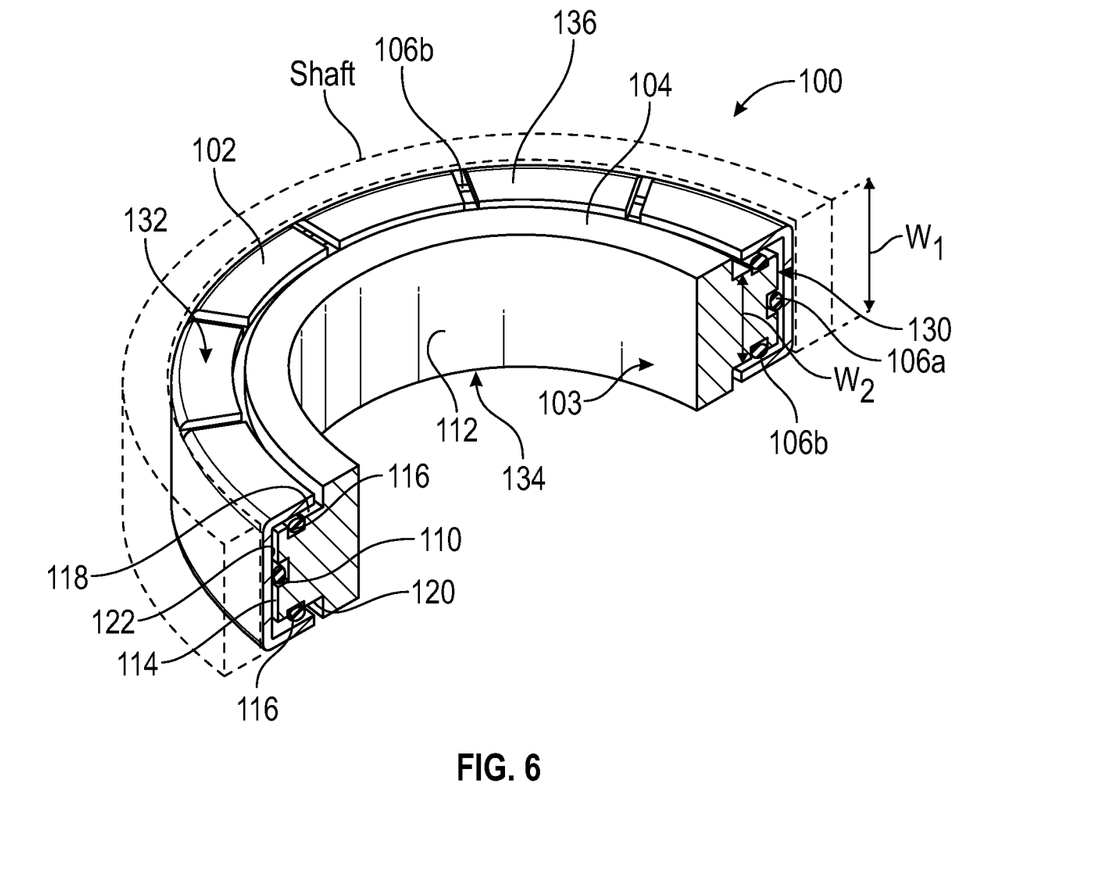
FIG. 6 is a longitudinal cross-section, perspective view of a torsional vibration damper mounted inside a shaft.

In another embodiment, shown in FIG. 6, the reverse configuration is also possible in which the inertia member 104 is disposed concentric with and spaced radially inward from the hub 102. In this embodiment, the hub 102 is mountable inside a shaft rather than on a shaft. Here, the annular inertia member 104 defines an annular recess 110 for receiving an elastomeric O-ring 106a in a radial outer surface 112 thereof and defines generally opposing annular recesses 116 for receiving additional elastomeric O-rings 106b, one each, in opposing top and bottom surfaces 118, 120 thereof. The opposing annular recesses 116 are positioned proximate the radial outer surface 112, which includes the annular recess 110. The hub 102 and the inertia member 104 are still held together by permanently deforming the hub 102, specifically the first plurality of spaced apart tabs 206a and the second plurality of spaced apart tabs 206, about the inertia member 104 over the plurality of elastomeric O-rings 1061, 106b that operatively couple the hub and the inertia member for rotation together. The torsional vibration damper attenuates torsional vibrations by being seated against the inner surface of the shaft, i.e., in a bore within the shaft. The plurality of elastomeric O-rings 106a, 106b are seated in an annular recess 110 in the radial outer surface 112 of the inertia member and in opposing annular recesses 116, one each, in the opposing top and bottom surfaces 118, 120 of the inertia member, thereby defining a clearance gap 130 therebetween.

The embodiments illustrated in the drawings have three O-rings that collectively define the clearance gap 130, but the invention is not limited thereto. The number of O-rings (and corresponding recesses) may be greater than three. Additional O-rings may be added to increase the frequency range of the torsional vibration damper. The additional O-rings may be seated in a recess on the radial inner or outer surface, whichever already has one recess and O-ring therein, and/or the top or bottom surface of the inertia member proximate to the annular recess(es) in the radial inner or outer surface.

The hub, in particular the hub precursors 200a, 200b, may be stamped, drawn, hydroformed, spun, forged, or machined using known or hereinafter developed techniques. Suitable material for the hub includes steel, aluminum, other suitable metals, plastics, or a combination thereof, including composite materials.

The inertia member 104 may be made from any material having a sufficient inertia, usually cast iron, steel, or similar dense material and may be cast, spun, forged, machined, or molded using known or hereinafter developed techniques. Accordingly, the annular recess 110 and the opposing annular recesses 116 may be machined into the inertia member 104 after the inertia member's formation or cast or molded into the inertia member 104 during the inertia member's formation.

In one embodiment, each of the elastomeric O-rings may be compressed, as in FIG. 2, about 1% to about 50% relative to their uncompressed, unassembled state shown in FIG. 3. Any suitable elastomer material for absorbing and/or damping the torsional vibrations generated by a rotating shaft upon which the torsional vibration damper is mounted may be used for the elastomeric O-rings. The elastomer material is preferably one suitable for automotive engine applications, i.e., suitable to withstand temperatures experienced in the engine and road temperatures and conditions. In one embodiment, the elastomeric members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The elastomer material may be a composite material that optionally includes a plurality of fibers dispersed therein. The fibers may be continuous or fragmented (chopped) aramid fiber like the fiber sold under the name TECHNORA® fiber.

Figure 1:
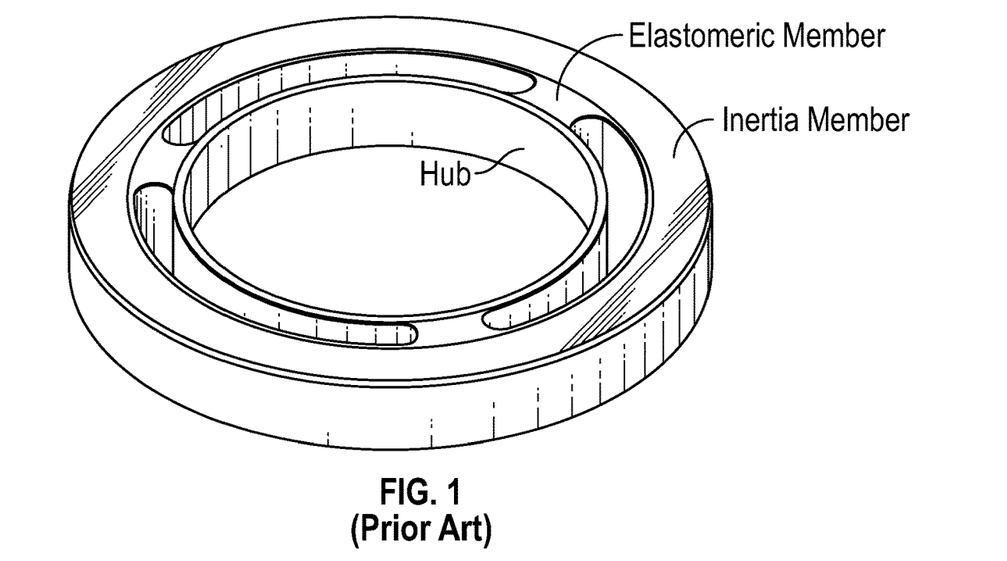
FIG. 1 is a side perspective view of a prior art injection molded torsional vibration damper.
Figure 4A:
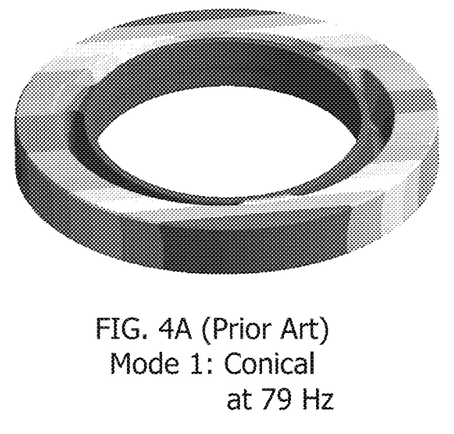
FIGS. 4A-4C are modal plots that are normalized such that the color bands show the deformation magnitude and the mode shape for the prior art torsional vibration damper of FIG. 1.
Figure 4B:
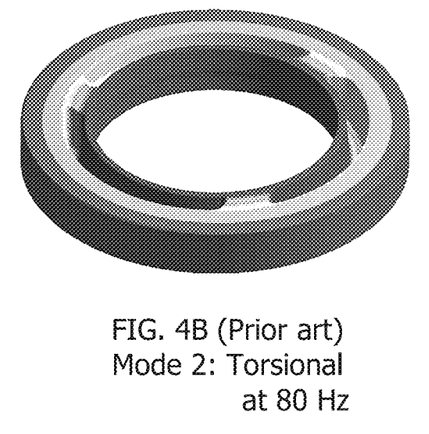
Figure 4C:
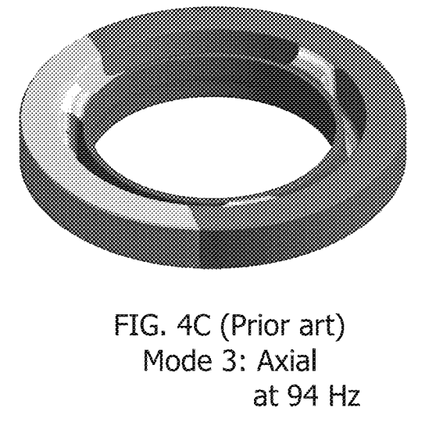

FIGS. 4A to 4C are normalized modal plots of the prior art vibration damper of FIG. 1. The red color shows maximum deflection and the blue color shows minimum deflection inversely varying along the colors of a rainbow (Blue, Teal, Yellow, Orange, and Red). This prior art vibration damper has a first mode of vibration that is conical, not torsional, at a frequency of 79 Hz as seen in FIG. 4A. The second mode of vibration is torsional at 80 Hz and the third mode of vibration is axial at 94 Hz. These modes of vibration are close together in a tight range—79 HZ to 94 Hz, with only 1 Hz between the first and second modes of vibration. This does not have adequate modal decoupling between the first and second modes of vibration.

Figure 5A:
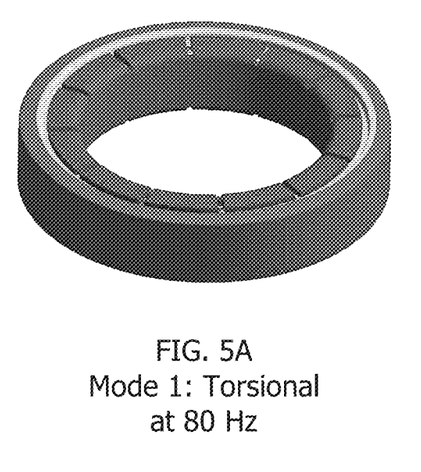
FIGS. 5A-5C are modal plots that are normalized such that the color bands show the deformation magnitude and the mode shape for the torsional vibration damper of FIG. 2.
Figure 5B:
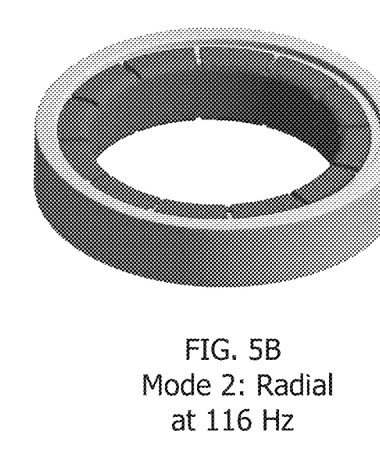
Figure 5C:
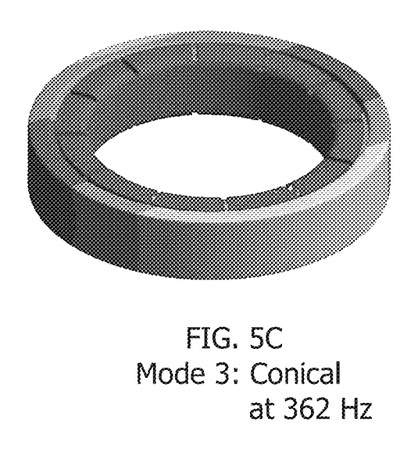

In contrast, normalized modal plots of the torsional vibration damper of FIG. 2 are shown in FIGS. 5A to 5C. Here, too, the red color shows maximum deflection and the blue color shows minimum deflection inversely varying along the colors of a rainbow (Blue, Teal, Yellow, Orange, and Red). The disclosed vibration damper has a first mode of vibration that is torsional at a frequency of 80 Hz as seen in FIG. 5A and the second mode of vibration is radial and is adequately decoupled from the first mode. Adequate decoupling is a separation of the frequencies by at least 20 Hz. As seen in FIG. 5B, the second mode, the one that is the nearest in frequency value, is 116 Hz, more than a 20 Hz separation (here, a 36 Hz separation). In other embodiments, the finite element modeling for the disclosed torsional vibration dampers demonstrates that the first and the second mode of vibration have adequate modal decoupling when the second mode of vibration is at a higher frequency, one that is different by at least 20 Hz. In some embodiments, the decoupling is in the range of 30 Hz to 40 Hz greater than the first mode of vibration.

The torsional vibration damper 100 is manufactured without the use of adhesives to hold the elastomeric members in place (i.e., it is a non-bonded torsional vibration damper), without a fastener to attach the hub to the inertia member, and without the use of fluids, such as lubricants, for the insertion of the elastomeric members. This simplifies the process and reduces the cost. The torsional vibration damper 100 also has enhanced robustness because the hub is permanently formed to the inertia member and has infinite push-off. This is especially useful when the torsional vibration damper is a low frequency damper that has to fit in a tight environment. In contrast, a standard torsional vibration damper in such environments would result in very low push-off forces and therefore would mandate bonding and would have fatigue concerns due to the larger contact area of the elastomer to the hub and inertia ring (which would be required to hold the hub and ring in position).

Referring to FIG. 3, the method of manufacturing the low frequency torsional vibration dampers 100 disclosed herein includes: providing an inertia member 104 defining an annular recess 110 for receiving an elastomeric O-ring 106a in a radial outer surface 114 or a radial inner surface 112 thereof (the radial inner surface being shown in FIGS. 2 and 3) and defining generally opposing annular recesses 116 for receiving elastomeric O-rings 106b, one each, in opposing top and bottom surfaces 118, 120 thereof; providing an annular hub precursor 200a or 200b comprising an annular band 202a, 202b having a first plurality of spaced apart tabs 204a, 204b and a second plurality of spaced apart tabs 206a, 206b both extending outward therefrom in opposing directions from two parallel circular bases 208 of the annular band or from two parallel cylindrical surfaces 209 of the annular band; and permanently bending the first plurality of spaced apart tabs 204a, 204b and the second plurality of spaced apart tabs 206a, 206b around the inertia member 104 in contact with each of the O-rings 106a, 106b seated in the annular recess 110 and the opposing annular recesses 116. As such, the O-rings 106a, 106b operatively couple the hub 102 to the inertia member 104 for rotation therewith. In all embodiments, the opposing annular recesses 116 are positioned proximate whichever of the radial outer surface 114 or the radial inner surface 112 has the annular recess 110, and have an elastomeric O-ring 106b, one each, in the annular recess 110 and the opposing annular recesses 116.

The method may also include providing the inertia member without the elastomeric O-rings in place, and as such, would require a step of placing an elastomeric O-ring, one each, in the annular recess and the opposing annular recesses of the annular inertia member, thereby forming an inertia member intermediate 212.

In the method, permanently bending the first plurality of spaced apart tabs 204a, 204b and the second plurality of spaced apart tabs 206a, 206b around the inertia member 104, in contact with each of the O-rings 106a, 106b, may be a one- or a two-step process. In a one-step process, the annular hub precursor, in particular precursor 200a, is inserted inside the radial inner surface 112 or around the radial outer surface 114 of the inertia member and a radially expanding press, typically having a horizontal fixture, that has two expanding heads, one aligned with the first plurality of spaced apart tabs 204a and the second aligned with the second plurality of spaced apart tabs 206a (expand radially outward in one embodiment and radially inward in the other embodiment) to permanently bend the tabs.

Referring to FIG. 3, in a two-step process, the first plurality of spaced apart tabs 204a, 204b from either of the two shown hub precursors 200a, 200b is permanently deformed by bending all the tabs to define a first flange 211 and form a hub precursor intermediate 210 having a first angle θ matable to a bottom surface 120 of the inertia member 104. Next, the inertia member intermediate 212 is seated against the hub precursor intermediate 210 with the first angle θ of the first flange 211 mated against the bottom surface 120 of the inertia member 104 with at least a first and a second O-ring 106a, 106b positioned between the hub precursor intermediate 210 and the inertia member 104. Then, the second plurality of spaced apart tabs 206a, 206b is permanently deformed against the inertia member intermediate 212 with a third O-ring 106b therebetween to operatively couple the hub 102 to the inertia member 104 for rotation therewith. This method has an advantage of being accomplished vertically, as in building a sandwich from the bottom upward, and using gravity and friction to help in locating and holding the inertia member 104 or inertia member intermediate 212 against the hub precursor intermediate 210 before and during the final step of permanently deforming the second plurality of spaced apart tabs 206a, 206b.

In one embodiment, the first plurality of spaced apart tabs and the second plurality of spaced apart tabs are aligned with one another. In another embodiment, the first plurality of spaced apart tabs are staggered offset from the second plurality of spaced apart tabs.

Still referring to FIG. 3, in all embodiments, the annular hub precursors 200a and 200b are constructed such that each tab of the first and second plurality of spaced apart tabs 204a, 204b and 206a, 206b has a first thickness $T_1$, respectively, that is substantially the same as a second thickness $T_2$ of the annular band 202a, 202b as measured from a longitudinal cross-section of the hub precursor. When the hub precursor is a cylindrical tube 200a, it has height $H_1$ that is greater than the second thickness $T_2$ of the annular band 202a. As illustrated, the first plurality of spaced apart tabs 204a and the second plurality of spaced apart tabs 206a are mirror images of one another but are not limited thereto. Instead, the tabs may have other variations, including those discussed herein. This annular hub precursor 200a may be made by cutting a preformed tube into segments having the desired height $H_1$, and thereafter cutting slits into the two parallel circular bases 208 thereof to form the first and second plurality of spaced apart tabs 204a, 206a.

When the hub precursor is a generally flat annular disc 200b, which may be formed by hydroforming it out of any of the appropriate metals listed above, the first plurality of spaced apart tabs 204b define the outer diameter of the disc and are each generally wedge-shaped. The second plurality of spaced apart tabs 206b define the inner diameter of the disc and are each generally wedge-shaped. Each generally wedge-shaped tab of the first plurality of spaced apart tabs 204b is narrowest at its junction to the annular band portion 202b of the hub precursor, and each generally wedge-shaped tab of the second plurality of spaced apart tabs 206b is widest at its junction to the annular band portion 202b. Here, the first plurality of spaced apart tabs 204b are aligned with the tabs of the second plurality of spaced apart tabs 206b. However, in another embodiment, the first plurality of spaced apart tabs and the second plurality of spaced apart tabs 204b, 206b may be offset from one another. The annular disc 200b has a height $H_2$ that is equal to the thicknesses $T_1$ and $T_2$ of the annular band 202b.

The torsional vibration damper disclosed herein eliminates mold bonding and/or adhesive bonding of the elastomeric member to the other components of the damper, and eliminates the need for fluid during assembly, such as lubricants for inserting the elastomeric members, which reduces the cost of manufacturing. Further, the torsional vibration dampers have "infinite" push-off without the use of fasteners.

Although the invention is shown and described with respect to certain embodiments, it is obvious that modifications will occur to those skilled in the art upon reading and understanding the specification, and the present invention includes all such modifications.

What is claimed is:

1. A frequency torsional vibration damper comprising:
   an annular inertia member defining a first annular recess for receiving an elastomeric O-ring in a radial outer surface or a radial inner surface thereof and defining generally opposing secondary annular recesses for receiving elastomeric O-rings in opposing top and bottom surfaces thereof, the opposing secondary annular recesses being positioned proximate whichever of the radial outer surface or the radial inner surface has the first annular recess;
   a plurality of elastomeric O-rings, one each seated in the first annular recess and the opposing secondary annular recesses; and a hub defining an annular receptacle with opposing sidewalls that each comprise a plurality of spaced apart tabs;

wherein the annular inertia member is seated in the annular receptacle with the plurality of spaced apart tabs permanently deformed against the plurality of elastomeric O-rings, thereby operatively coupling the hub to the inertia member for rotation together;

wherein when the inertia member defines the outer diameter of the torsional vibration damper, the hub is mountable on a shaft, and when the inertia member defines the inner diameter of the torsional vibration damper, the hub is mountable inside a shaft.

2. The torsional vibration damper of claim 1, wherein the inertia member has a first portion with a primary axial width and a second portion with a secondary axial width, wherein the second portion is seated in the annular receptacle defined by the hub and the secondary axial width is smaller than the primary axial width.

3. The torsional vibration damper of claim 1, wherein the plurality of elastomeric O-rings are seated in the first annular recess and the opposing secondary annular recesses without an adhesive.

4. The torsional vibration damper of claim 1, wherein there is no adhesive or fastener attaching the hub to the inertia member.

5. The torsional vibration damper of claim 1, wherein finite element modeling demonstrates that the torsional vibration damper has a first mode of vibration that is torsional and a second mode of vibration that is radial.

6. The torsional vibration damper of claim 5, wherein finite element modeling demonstrates that the second mode of vibration is decoupled from the first mode of vibration by at least 20 Hz.

7. The torsional vibration damper of claim 1, wherein the annular receptacle of the hub defines annular recesses that align one each with the first annular recess and the opposing secondary annular recesses of the inertia member.

8. A method of making the torsional vibration damper of claim 1, the method comprising:

providing an inertia member defining a first annular recess for receiving an elastomeric O-ring in a radial outer surface or a radial inner surface thereof and defining generally opposing secondary annular recesses for receiving elastomeric O-rings in opposing top and bottom surfaces thereof, the opposing secondary annular recesses being positioned proximate whichever of the radial outer surface or the radial inner surface has the annular recess, and having an elastomeric O-ring, one each, in the first annular recess and the opposing secondary annular recesses;

providing an annular hub precursor comprising an annular band having a first plurality of spaced apart tabs and a second plurality of spaced apart tabs both extending outward therefrom in opposing directions from two parallel circular bases of the annular band or from two parallel cylindrical surfaces of the annular band, wherein each tab of the first and second plurality of spaced apart tabs has a first thickness substantially the same as a second thickness of the annular band as measured from a longitudinal cross-section of the hub precursor;

permanently bending the first plurality of spaced apart tabs and the second plurality of spaced apart tabs around the inertia member in contact with each of the elastomeric O-rings;

wherein the elastomeric O-rings operatively couple the hub to the inertia member for rotation therewith.

9. The method of claim 8, further comprising providing the inertia member and the elastomeric O-rings in an unassembled state and placing one each of an elastomeric O-ring in the first annular recess and the opposing secondary annular recesses of the annular inertia member, thereby forming an inertia member intermediate.

10. The method of claim 8, wherein permanently bending the first plurality of spaced apart tabs and the second plurality of spaced apart tabs around the inertia member comprises:

first, permanently bending the first plurality of spaced apart tabs to define a first flange and form a hub precursor intermediate having a first angle matable to a bottom surface of the inertia member;

seating the inertia member intermediate against the hub precursor intermediate with the first angle of the first flange mated against the bottom surface of the inertia member with at least a first and a second O-ring positioned between the hub precursor intermediate and the inertia member intermediate;

permanently bending the second plurality of spaced apart tabs against the inertia member intermediate with a third O-ring therebetween to operatively couple the hub to the inertia member for rotation therewith.

11. The method of claim 8, wherein the hub precursor is a generally flat annular disc.

12. The method of claim 11, wherein the second plurality of spaced apart tabs define the inner diameter of the disc and are each generally wedge-shaped.

13. The method of claim 12, wherein the first plurality of spaced apart tabs define the outer diameter of the disc and are each generally wedge-shaped.

14. The method of claim 13, wherein each generally wedge-shaped tab of the first plurality of spaced apart tabs is narrowest at its junction to the annular band portion of the hub precursor, and each generally wedge-shaped tab of the second plurality of spaced apart tabs is widest at its junction to the annular band portion of the hub precursor.

15. The method of claim 11, further comprising hydroforming the hub precursor.

16. The method of claim 8, wherein the first plurality of spaced apart tabs and the second plurality of spaced apart tabs are mirror images of one another.

17. The method of claim 8, wherein the first plurality of spaced apart tabs are staggered offset from the second plurality of spaced apart tabs.

18. The method of claim 8, wherein the hub precursor is a cylindrical tube having a height greater than the second thickness, and the method further comprises forming the hub precursor by cutting slits into two parallel circular bases of a metal cylindrical tube.

19. The method of claim 18, wherein the first plurality of spaced apart tabs and the second plurality of spaced apart tabs are mirror images of one another.

* * * * *